United States Patent
Raam et al.

(10) Patent No.: US 6,389,527 B1
(45) Date of Patent: May 14, 2002

(54) MICROPROCESSOR ALLOWING SIMULTANEOUS INSTRUCTION EXECUTION AND DMA TRANSFER

(75) Inventors: Michael Raam, Cupertino, CA (US); Toru Utsumi, Kawasaki; Takeki Osanai, Ebina, both of (JP); Kamran Malik, San Jose, CA (US)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 09/246,406

(22) Filed: Feb. 8, 1999

(51) Int. Cl.[7] .............................................. G06F 15/00
(52) U.S. Cl. ........................... 712/38; 712/32; 711/122; 711/131; 711/136; 711/138; 711/139; 711/141; 711/145; 711/146
(58) Field of Search ................................. 711/122, 131, 711/136, 138–139, 141, 145, 146; 712/32, 38

(56) References Cited

U.S. PATENT DOCUMENTS

| | | | | |
|---|---|---|---|---|
| 5,119,485 A | * | 6/1992 | Ledbetter, Jr. et al. | 711/146 |
| 5,418,910 A | * | 5/1995 | Siegel | 710/52 |
| 5,426,765 A | * | 6/1995 | Stevens et al. | 711/131 |
| 5,524,208 A | * | 6/1996 | Finch et al. | 714/25 |
| 5,557,769 A | * | 9/1996 | Bailey et al. | 711/146 |
| 5,694,575 A | * | 12/1997 | Oba et al. | 711/146 |
| 5,706,464 A | * | 1/1998 | Moore et al. | 711/122 |
| 5,749,093 A | * | 5/1998 | Kobayashi et al. | 711/139 |
| 5,749,094 A | * | 5/1998 | Jaggar | 711/139 |
| 5,751,996 A | * | 5/1998 | Glew et al. | 711/145 |
| 5,765,194 A | * | 6/1998 | McBride | 711/138 |
| 5,768,628 A | * | 6/1998 | Priem | 710/62 |
| 5,809,528 A | * | 9/1998 | Miller et al. | 711/136 |
| 5,996,051 A | * | 11/1999 | Mergard | 711/147 |
| 6,119,217 A | * | 9/2000 | Suzuoki | 712/36 |

* cited by examiner

*Primary Examiner*—Larry D. Donaghue
*Assistant Examiner*—Nabil El-Hady
(74) *Attorney, Agent, or Firm*—Gray Cary Ware & Freidenrich LLP

(57) ABSTRACT

The present invention comprises a LSU which executes instructions relating to load/store. The LSU includes a DCACHE which temporarily stores data read from and written to the external memory, an SPRAM used to specific purposes other than cache, and an address generator generating virtual addresses for access to the DCACHE and the SPRAM. Because the SPRAM can load and store data by a pipeline of the LSU and exchanges data with an external memory through a DMA transfer, the present invention is especially available to high-speedily process a large amount of data such as the image data. Because the LSU can access the SPRAM with the same latency as that of the DCACHE, after data being stored in the external memory is transferred to the SPRAM, the processor can access the SPRAM in order to perform data process, and it is possible to process a large amount of data with shorter time than time necessary to directly access an external memory.

20 Claims, 10 Drawing Sheets

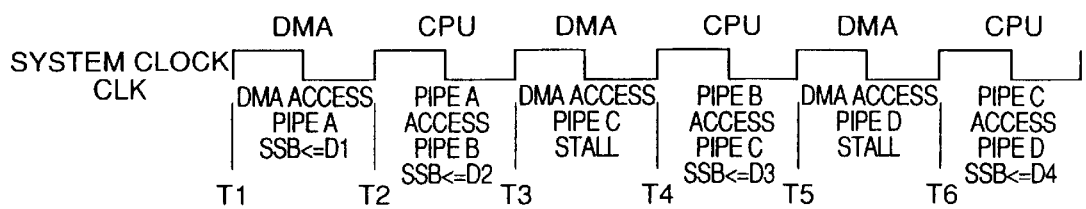
FIG. 10    PIPELINE STALL ON BACK-TO-BACK SPRAM ACCESSES
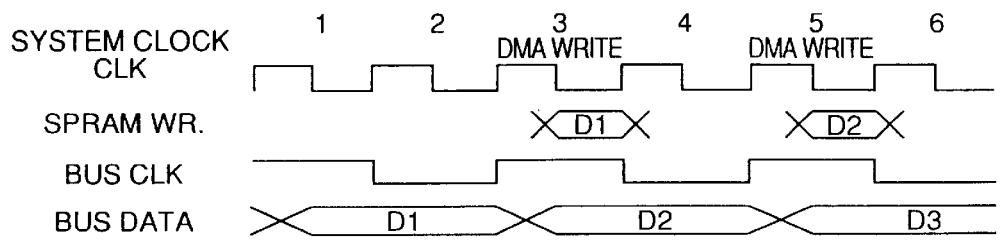
FIG. 11    SPRAM DMA WRITE TIMING
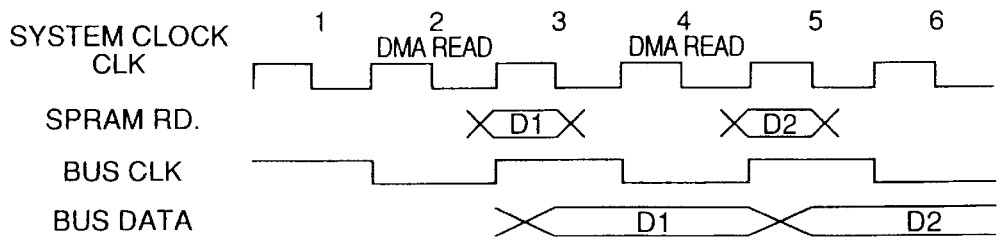
FIG. 12    SPRAM DMA READ TIMING

MICROPROCESSOR ALLOWING SIMULTANEOUS INSTRUCTION EXECUTION AND DMA TRANSFER

TECHNICAL FIELD

The present invention relates to the internal configuration of a microprocessor, that can read and write data more quickly than external memories.

BACKGROUND

Because of advances in processor speed, the speed difference between processor and a main memory has increased. In order to minimize the effect of the speed difference, a high-speed cache memory with small memory capacity may be arranged between the processor and the main memory, If data required by the processor exists in the cache memory, data read out from the cache memory is delivered to the processors. Therefore, the main memory is accessed less frequently, and the processor can perform processes at higher speeds.

However, when the capacity of the cache memory is large, it takes a long time to determine whether particular data exists in the cache memory and to read or write data from the large memory array; accordingly, performance of the memory access deteriorates. Therefore, it is inefficient to enlarge the memory capacity so much. Furthermore, in order to process a large amount of data using the cache memory, it is necessary to frequently refill the cache memory; accordingly, performance penalty of cache miss is not negligible.

Furthermore, when accessing frequency for the same address in the cache memory is high, the cache hit rate is improved; as a result, it is possible to execute the processes at high speed. On the other hand, when the accessing frequency for the same memory address is low, the cache miss rate becomes high; as a result, performance of the memory access deteriorates.

For example, to display a moving image in three dimensions, it is necessary to transmit the image data between the memory and the processor at high speed. Accordingly, it is desirable to store the image data in the memory accessible with almost the same speed as that of the cache memory. However, because the amount of the image data is high and the accessing frequency for the same memory address is low, it is not desirable to store the image data in the cache memory.

SUMMARY

An object of the present invention is to provide a microprocessor being able to read and write data with almost the same latency as that of the cache memory and including a RAM available for purpose which is different from the cache memory.

In order to achieve the foregoing object, a microprocessor comprising:
 a load/store instruction executing block for executing a load/store instruction; and
 a RAM (Random Access Memory), from and to which said load/store instruction executing block is able to read and write data, said RAM exchanging data with an external memory through a DMA (Direct Memory Access) transfer Because a RAM according to the present invention is able to read and write data from and to a load/store unit and to exchange data with an external memory through a DMA, the RAM is available as a temporary work area to process a large amount of data, such as image data.

Furthermore, when a processor having an instruction set is emulated, the RAM according to the present invention is available as the temporary work area which reads the emulated instruction set, converts to a native instruction set, and fabricates the native instruction set. The code in the native instruction set which is generated in the RAM may be edited in the RAM for the purpose of performance improvement, for example, reorder instructions to solve read after write hazard on general purpose registers.

Furthermore, if a store buffer is provided, even if an access to the RAM by the load/store instruction unit conflicts with an access to the RAM by a DMA transfer, a pipeline stall does not occur.

Furthermore, if the RAM has a snoop function, it is possible to take out data being stored in the memory as necessary, and the program design is simplified.

BRIEF DESCRIPTION OF THE DRAWINGS

FIG. 10 is a timing chart where the access by the executing unit conflicts with the DMA transfer;

FIG. 11 is a timing chart showing write timing of the SPRAM;

FIG. 12 is a timing chart showing read timing of the SPRAM;

DESCRIPTION OF THE PREFERRED EMBODIMENTS

A microprocessor according to the present invention is described in detail with reference to the attached drawings as follows.

Figure 1:
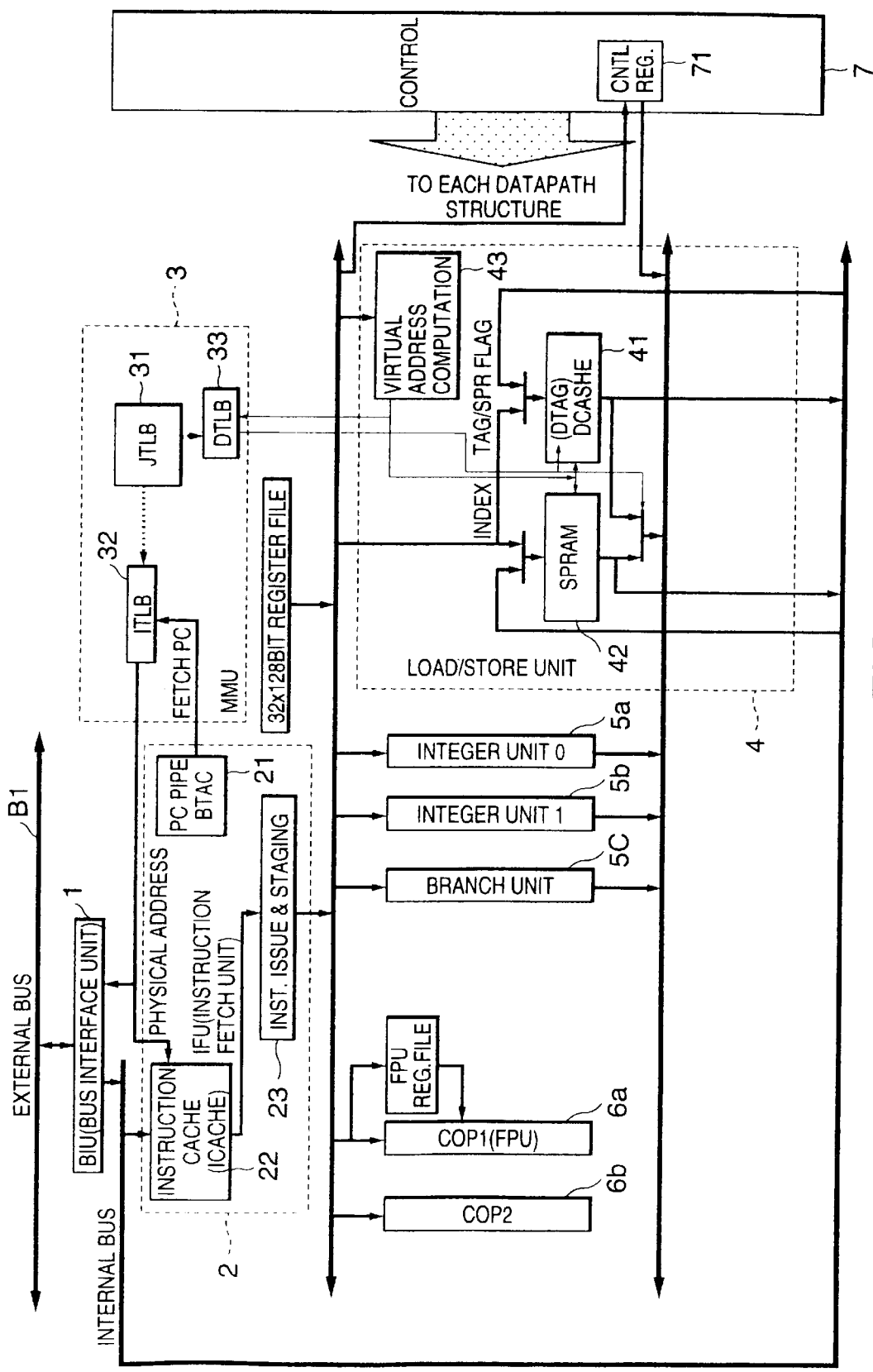
FIG. 1 is a block diagram showing an internal configuration of a microprocessor of a first embodiment according to the present invention.

FIG. 1 is a block diagram showing the internal configuration of the microprocessor according to the present invention. The microprocessor of FIG. 1 has a Bus Interface Unit 1 connected to an external bus B1, an IFU (Instruction Fetch Unit) 2 which fetches instructions executed by a processor, an MMU (Memory Management Unit) 3 which converts virtual addresses to physical addresses, an LSU (Load Store Unit) 4 which executes instructions relating to load/store, a plurality of executing units 5a, 5b and 5c which execute instructions other than load/store, FPU (Floating Point Units) 6a, 6b and 6c which execute floating radix point calculation, and a Control Logic 7 which controls each block in the processor.

The IFU 2 includes a PC-pipe 21 which generates a PC (Program Counter) by referring to the BTAC which stores the branch address of the instruction such as a branch instruction, an ICACHE (Instruction Cache memory) 22 which temporarily stores the instructions, and an Instruction issue & Staging block 23 which recognizes the type of the instructions and selects an executing unit to execute the recognized instructions.

MMU 3 has three TLBs (Translation Lookaside Buffers) which convert the virtual addresses to physical addresses. Address converting information needed by the processor, such as a physical page number and memory protection information, is written to the TLBs. Based on this information, the MMU 3 executes the conversion to the physical address.

Three types of the TLBs in the MMU 3 are a JTLB (Joint Translation Lookaside Buffer) 31, an ITLB (Instruction Translation Lookaside Buffer) 32, and a DTLB (Data Translation Lookaside Buffer) 33.

Among these three TLBs, the JTLB 31 is a true TLB. For example, the JTLB 31 has: 48 entries, and maps the virtual addresses at each page, regardless of the instruction or data.

On the other hand, the ITLB 32 and the DTLB 33 are each called a micro TLB as a generic name. The ITLB 32 is a specific TLB connected directly to a datapath of the virtual address of the instructions. The DTLB 33 is a specific TLB connected directly to datapath of the virtual address of data. These TLBs have few entries, and execute address conversion at high speed. A portion of a conversion table generated by the JTLB 31 is transferred to the ITLB 32 or the DTLB 33 as necessary.

The JTLB 31 is controlled by the software, while the coherency between the micro TLBs and the JTLB is maintained by the hardware. The processor issues an exception when there is no conversion table in the JTLB 31. An exception handler searches the corresponding page from a page table of an OS and writes the information of the conversion table 100 into the JTLB 31.

The LSU 4 has a DCACHE (Data Cache Memory) 41 which temporarily stores data read out from and written into the external memory, an SPRAM (Scratch Pad RAM) 42 used for a specific purpose other than caching, and an address generator (Virtual Address Computation) 43 which generates the virtual address necessary to access the DCACHE 41 and the SPRAM 42.

The Control Logic 7 controls each block in the processor. Inside the Control Logic 7, a Control Register 71 is provided.

Next, the operation of the microprocessor of FIG. 1 is explained. First of all, the IFU 2 fetches the instructions based on the PC generated by the PC-pipe 2. Here, the PC is a virtual address.

The ITLB 32 converts the PC from the virtual address to the physical address. The physical address is employed to search for an ITAG in the ICACHE 22. The physical address is used to detect whether the instruction designated by the PC exists in the ICACHE 22. When the instruction designated by the PC does not exist in the ICACHE 22, that is, when a cache-miss occurs, the access to the external memory (not shown) by the physical address is performed.

When a cache-miss occurs, information informing of the occurrence of the cache-miss and physical address this information are delivered to a Control Logic in the BIU 1. The BIU 1 accesses the external memory based on these information. When the access to the memory finishes, data and a signal informing of acquisition of the cache line are supplied to the IFU 2. The IFU 2 writes the data obtained by the access to the memory into the ICACHE 22. At the same time, among the instructions included in the refilled cache line, the instruction designated by the PC and in certain cases, several instructions following the instruction designated by the PC are supplied to the Instruction issue & Staging block 23.

On the other hand, if the instructions designated by the PC exists in the ICACHE 22, the corresponding instructions in the ICACHE 22 and in certain cases, several instructions following the instructions designated by the PC are supplied to the Instruction issue & Staging block 23.

The Instruction issue & Staging block 23 recognizes the type of the instructions and determines the executing unit to execute the instructions, for example, the LSU 4 or another executing unit. The Instruction issue & staging block 23 determines any one of the executing units dynamically in accordance with vacant status of each executing unit.

For example, when the recognized instruction is a load/store instruction, because only the LSU 4 is able to execute the instruction, when the Instruction issue & Staging block 23 sends the instruction to the LSU 4 at the time when being ready to send an instruction.

Figure 2:
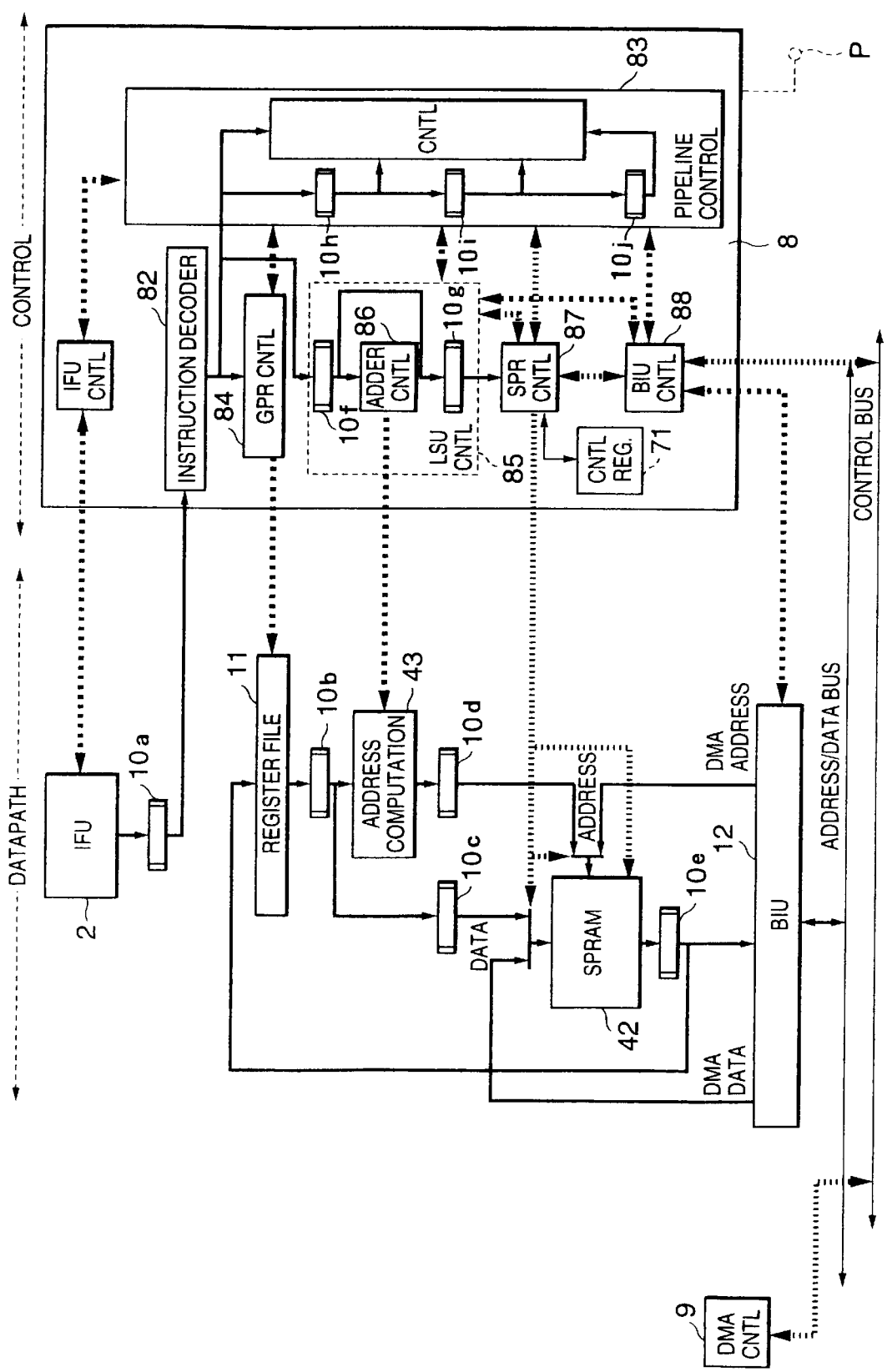
FIG. 2 is a diagram showing a portion of the internal configuration of the LSU 4 shown in FIG. 1.

Next, the load/store operations to the SPRAM 42 will be explained. FIG. 2 is a diagram showing a portion of the inside configuration of the LSU 4 shown in FIG. 1. In FIG. 2, the SPRAM 42 is separately shown in two parts, the control part (Control 8) and the datapath.

The Control 8 of FIG. 2 generates a control signal which is supplied to the Datapath in accordance with the flow of instructions. The Datapath releases data in accordance with the control signal from the Control 8.

In FIG. 2, each line connecting the Control 8 and the Datapath represents a control signal. Usually, the control signal is supplied to the Datapath from the Control 8. There is also a control signal supplied from the Datapath to the Control 8 which is not shown in FIG. 2. For example, when pipeline processes are stopped in accordance with the cache-miss of the ICACHE 22, a miss signal from the TAG of the ICACHE 22, which is a part of the Datapath, is supplied to the Control 8 in order to stop the pipeline processes.

In FIG. 2, the block designated by the reference numeral 10a, 10b, . . . , 10j stands for a register structure which separate each of stages executing the pipeline processes. These blocks 10a, 10b, . . . , 10j include circuits including flip-flops and latches, and execute the reading and the writing processes in sync with a clock. Hereinafter, such blocks 10a, 10b, . . . , 10j will be called pipeline registers as a generic name.

The IFU 2 stores the fetched instructions in the pipeline register 10 based on control by an IFU Control 81. The instructions are sent from the pipeline register 10a to a Instruction Decoder 82. The Instruction Decoder 82 generates a transitive control signal which is necessary for discrimination and processing of the instructions. The Instruction Decoder 82 generates a more abstract signal than the control signal of a calculator.

When the Instruction Decoder 82 recognizes that the fetched instructions are the load/store instructions, a control signal group is sent to the relative Control Logic block. In other words, as shown in FIG. 2, the control signal group is sent to a Pipeline Control 83, a GPR (General Purpose Register) Control 84, and an LSU Control 85, as shown in FIG. 2.

In the Pipeline Control 83 and the LSU Control 85, the instructions and the control signals flow in sync with stages of data flow. Because of this, the pipeline registers 10a, 10b, . . . , 10j are provided for both the Control 8 and the Datapath.

The Pipeline Control 83 controls the flow of the pipeline in accordance with the condition of the pipeline register 10a, 10b, . . . , 10j. For example, when a resource hazard occurs on the calculator, processes which stop the pipeline are executed.

The LSU Control 85 generates the control signal which is necessary to execute the load/store instruction. That is, data sent from a register file 1 to the pipeline register 10b by control of the GPR Control 84 is sent to an address generator 43 in order to generate the addresses. The Address Generator 43 is controlled by the Adder Control 86. The addresses generated by the address Generator 43 are sent to the pipeline register 10d of next stage.

SPR (SPRAM) Control 87 accesses the SPRAM based on signals from the Pipeline Control 83 and the LSU Control 85. At this point, the address of the pipeline register 10d is used. When this address corresponds to a load instruction, a read enable signal is asserted, and a write enable signal is deasserted. Accordingly, data in the SPRAM 42 is read out and stored in the pipeline register 10e. The stored data is written to the register file 11 at next stage.

When the address in the pipeline register 10d corresponds to the store instruction, the read enable signal is deasserted, and the write enable signal is asserted effect. Accordingly, data staged from the register file 11 is written into the SPRAM 42.

On the other hand, a DMA (Direct Memory Access) controller 9 provided externally to the processor is, as shown in FIG. 2, connected to a BIU Control 88 in the processor via an external bus. When the DMA controller 9 sends the control signal to the BIU Control 88 and then the DMA process is started, the BIU Control 88 sends the signal to the SPR Control 87 in order to execute the reading or writing operation for the SPRAM 42. That is, the SPR Control 87 is also connected indirectly to the DMA controller 9 via the BIU Control 88.

When access requirements for the SPRAM is issued from both the LSU 4 and the BIU 12(the source of the access requirement from the BIU 12 is the DMA controller 9), the SPR Control 87 arbitrates requirements from both in order to determine the enable signal group, and changes a selector of the inputted address and data.

For example, in order to programmably control a priority of the access requirement for the SPRAM 42 by the LSU 4 and the BIU 12, as shown by the dotted line in FIG. 2, a control register 71 may be connected to the SPR Control, and the value of the control register 71 may be programmably changed in accordance with the priority.

For example, in order to programmably control a priority of the access requirement for the SPRAM 42 by the LSU 4 and the BIU 12, as shown by dashed line in FIG. 2, a control register may be connected to the SPR Control 71, and the value of the control register may be programmably changed in accordance with the priority. Otherwise, as shown by dashed line in FIG. 2, the priority may be changed in accordance with the signal inputted to the external pin P of the processor.

Next, the method using the SPRAM 42 is explained. FIG. 3 is a diagram showing an example using the SPRAM 42 for a process to convert imaging data and the instructions. Thereafter, the operation of the SPRAM 42 will be explained using FIG. 3.

Figure 3A:
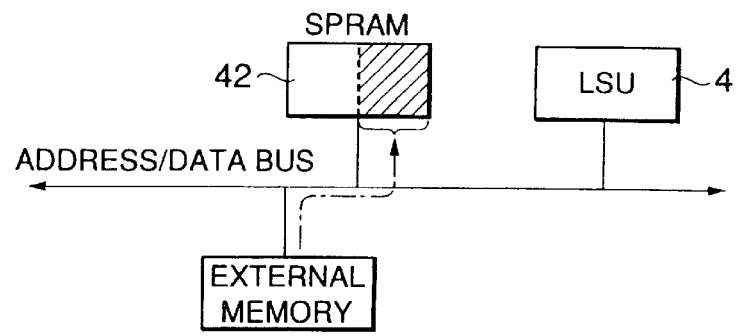
FIGS. 3A, 3B and 3C are a mimetic diagram showing an example using the SPRAM to the converting process of the imaging data and the instructions.

(1) First of all, as shown in FIG. 3A, the image data in the external memory is stored in half of the SPRAM 42 by a DMA transfer.

Figure 3B:
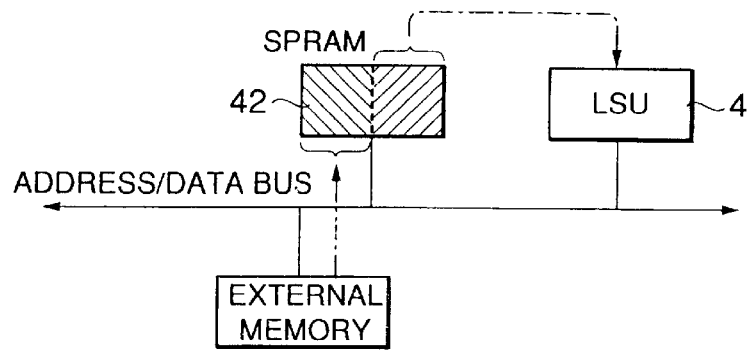

(2) Next, as shown in FIG. 3B, data stored in the SPRAM 42 is transferred to the general register by the load instruction. After data is processed by the executing units such as Integer Units 5a, 5b and so on, the processed data is stored in the SPRAM 42. At the same time, the image data of the external memory is stored in the other half area in the SPRAM 42 by the DMA transfer.

Figure 3C:
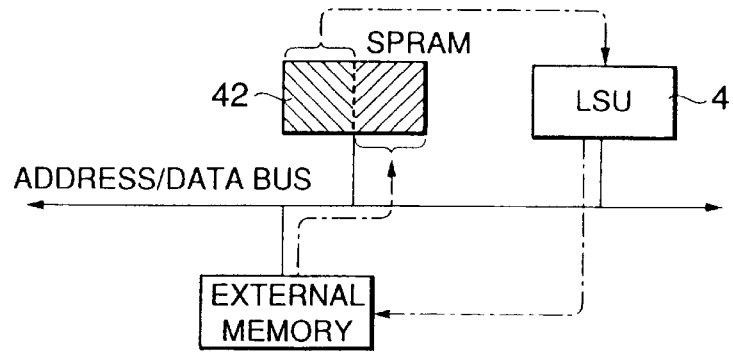

(3) Next, as shown in FIG. 3C, the processed data is stored in the external memory by the DMA transfer. At the same time, data stored in the other half of the SPRAM 42 is processed by the LSU 4, and the image data in the external memory is stored in the half area in the SPRAM 42.

Thus, because the SPRAM 42 of FIG. 1 can load/store by the pipeline of the LSU 4, and transfer data by the DMA, the SPRAM 42 is particularly suited to the high-speed processing of a large amount of data such as image data and instructions at high speed. That is, the SPRAM 42 is particularly suited for use as a temporary memo pad area (work area) to process a large amount of data such as the image data, the instructions and so on.

Because the LSU 4 can access the SPRAM 42 with the same latency (the number of a system clock necessary to the memory access) as that of the DCACHE 41, once data stored in the external memory is transferred to the SPRAM 42, the processor can later access the SPRAM 42 in order to execute data process; accordingly, it is possible to process a large amount of data in shorter time than would be required when accessing an external memory.

Because the SPRAM 42 of this preferred embodiment uses the DMA in order to transmit data to the external memory, even if the processor is executing the other processes, it is possible to transmit data to the external memory.

Because the SPRAM 42 of this preferred embodiment is accommodated in the chip including the executing units such as the LSU 4, a core portion of the microprocessor, drawbacks such as signal delay and noise hardly occurs. Furthermore, the packaging area and the power consumption are decreased.

Figure 4:
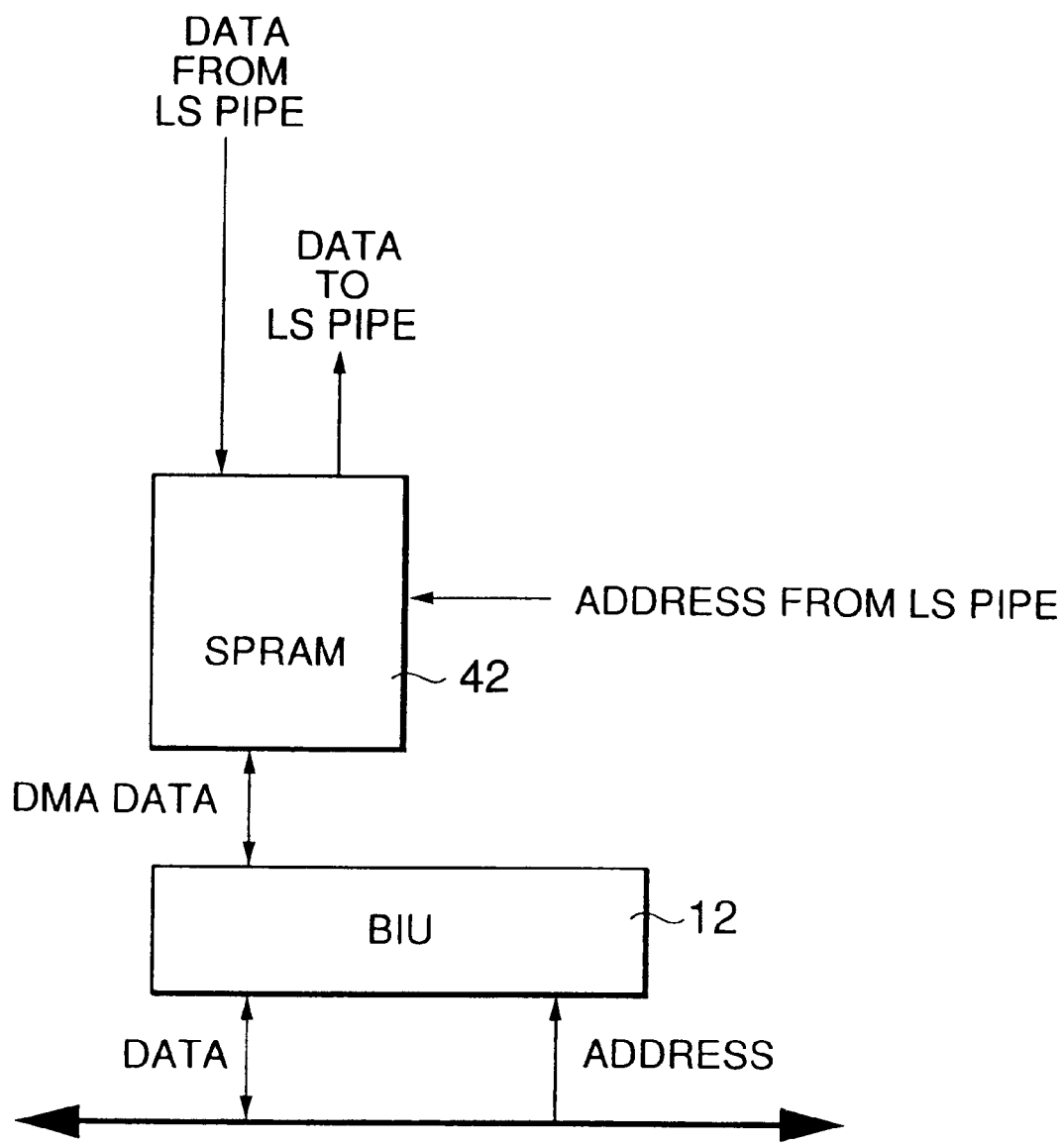
FIG. 4 is a circuit diagram of the periphery of the SPRAM.

Though an example providing the SPRAM 42 and the DCACHE 41 in the LSU 4 has been explained in FIG. 1, the DCACHE 41 may be omitted. FIG. 4 is a circuit diagram of the periphery of the SPRAM 42 when the DCACHE 41 is not included. As shown in FIG. 4, the SPRAM 42 is connected to address/data bus via the BIU 12 which arbitrates the bus, and the external memory storing the image data, the instructions and so on are connected to this bus.

Figure 5:
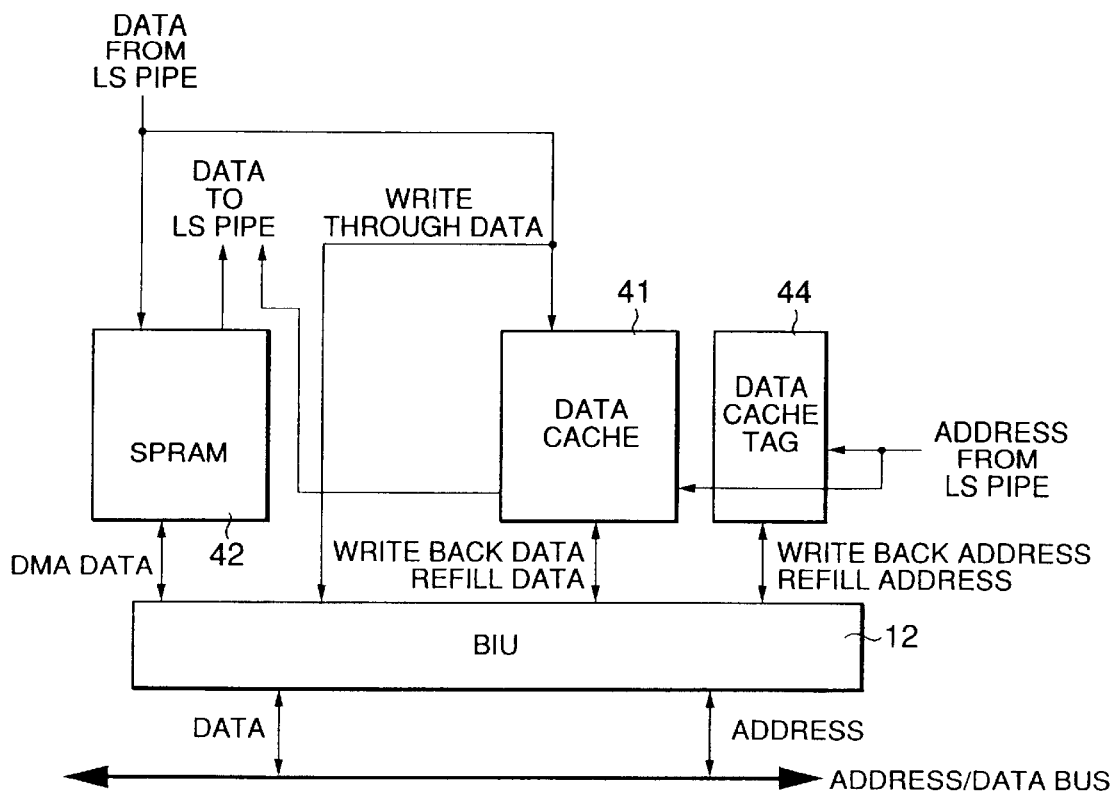
FIG. 5 is a circuit diagram of the periphery of the SPRAM in the processor having the SPRAM and the DCACHE.

On the other hand, FIG. 5 is a circuit diagram of the periphery of the SPRAM 42 in a processor having both of the SPRAM 42 and the DCACHE. The SPRAM 42, the DCACHE 41, and the TAG 44 for the DCACHE 41 are connected to the BIU 12. The DCACHE 41 is used to store a portion of data read out from the external memory. The TAG 44 is used to store attribute information (for example, addresses).

As shown in FIG. 5, if the SPRAM 42 and the DCACHE 41 are both provided, it is possible to use the DCACHE 41 for normal memory access and to use the SPRAM 42 when it is necessary to process a large amount of data such as image data. That is, it is possible to improve the throughput of all the system by switching between the SPRAM 42 and the DCACHE 41 depending on the process.

Figure 6:
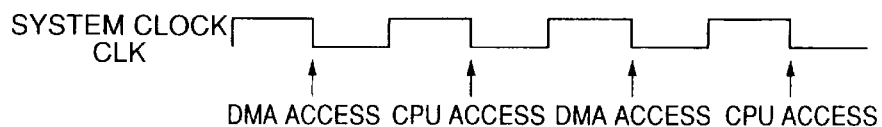
FIG. 6 is a timing chart showing the process in the situation where the access by each executing unit in the processor conflicts with the DMA.

FIG. 6 is a timing chart showing the process when the access by each executing unit in the processor conflicts with the DMA transfer. If the SPRAM 42 with one port to which a plurality of devices cannot access at the same time, if the access by each executing unit in the processor conflicts with the DMA, the access priority is, for example, determined by the control register 71 of FIG. 1. More specifically, programmers switch the bit value of the control register 71 in accordance with the priority.

FIG. 6 is a timing chart showing an example where the frequency of the bus clock is the half frequency of the system clock of the processor. In this case, the DMA transfers are executed in sync with a bus clock, and during intervals between the DMA transfers, the access by each executing unit is performed. By performing the access in such a way, none of the executing units stalls.

Thus, because the access of the SPRAM 42 by the executing unit (for example, the pipeline of the LSU 4) is executed during intervals between DMA transfers, when the pipeline of the LSU 4 is going to access the SPRAM 42 at the same timing as that of the DMA, the pipeline may stall.

Figure 7:
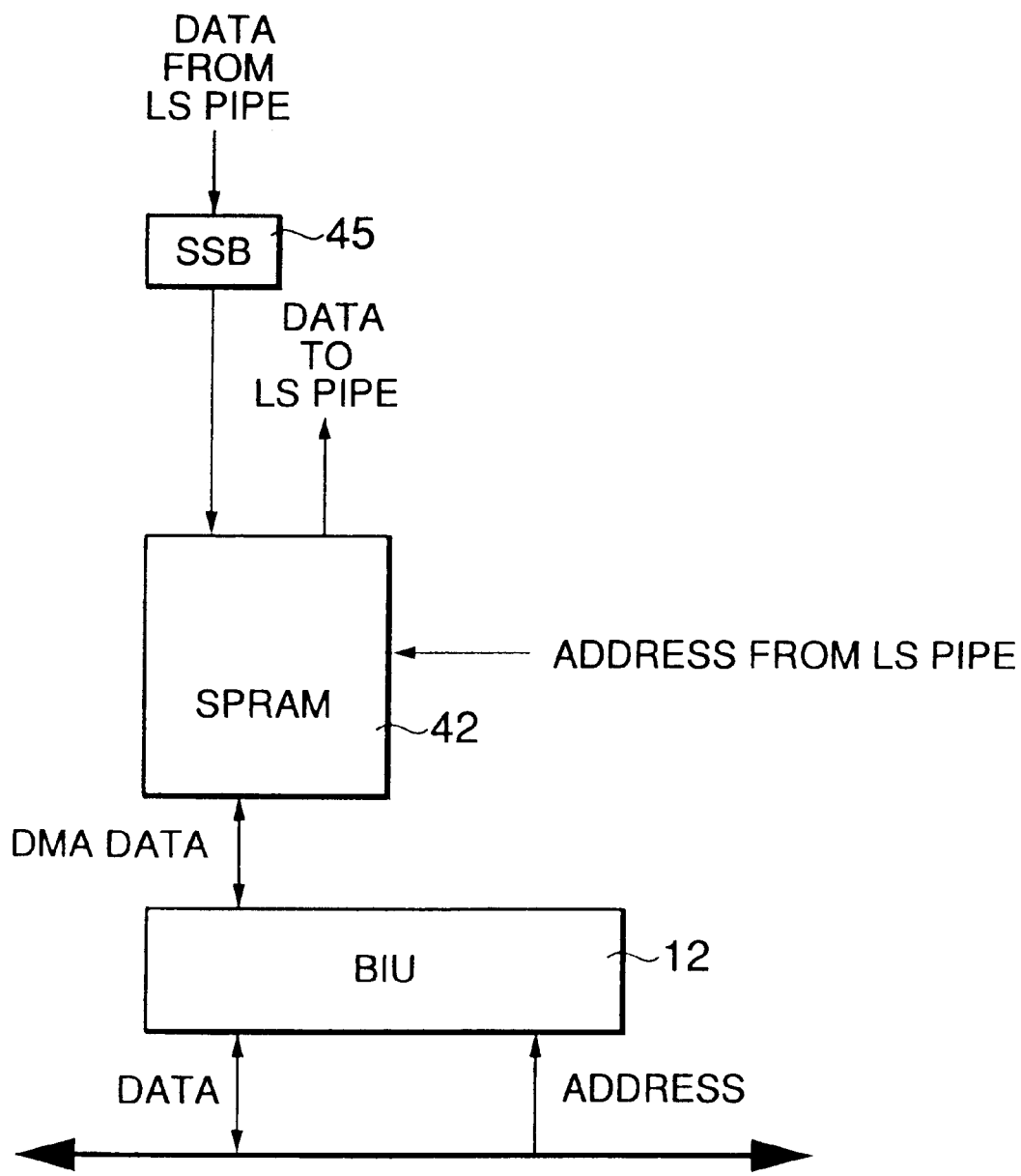
FIG. 7 is a diagram showing that the stall is avoided by providing a SSB.
Figure 8:
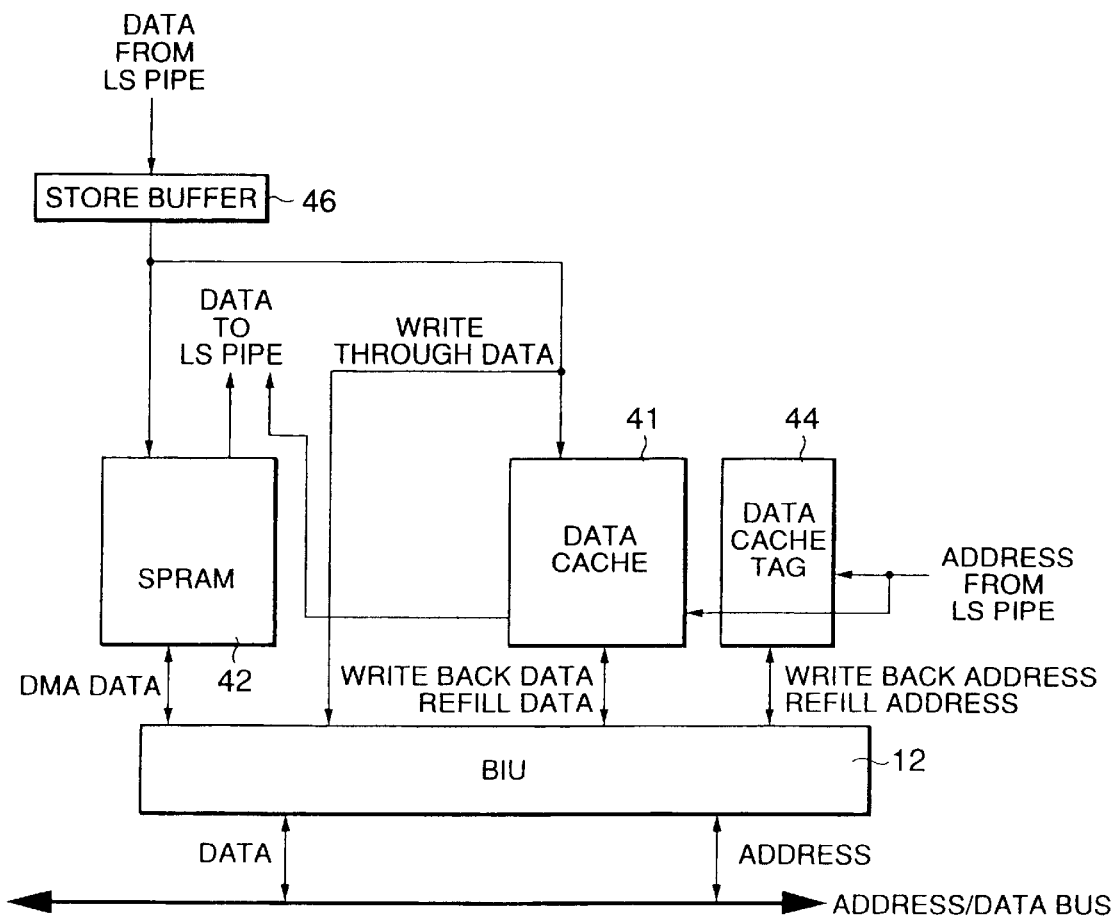
FIG. 8 is a diagram showing an example wherein both the SPRAM and the DCACHE include a common store buffer.
Figure 9:
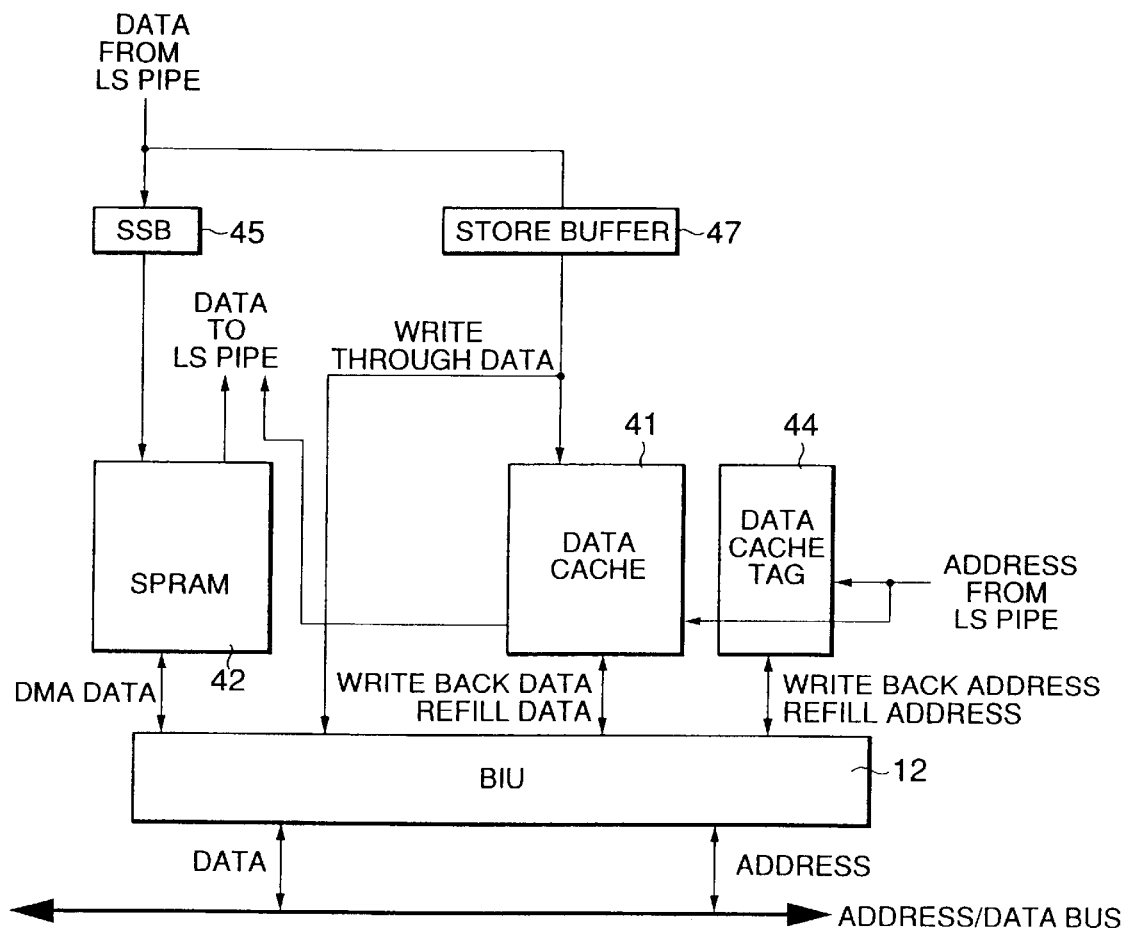
FIG. 9 is a diagram showing an example providing the specific SSB for the SPRAM and the specific store buffer for the DCACHE.

In this case, the stall is avoided by providing a SSB (SPRAM Store Buffer) 45, as shown in FIG. 7. The instructions the pipeline executes are stored temporarily in this SSB 45. FIG. 7 indicates how the SSB 45 without the DCACHE 41 is connected, and FIG. 8 is an example of an SPRAM 42 and a DCACHE 41 having a common store buffer 46. FIG. 9 is a diagram showing an example of an SPRAM with a specific SSB 45 and a specific store buffer 47 for the DCACHE 41.

As shown in FIG. 7–9, by providing the SSB 45 or the store buffer 46 and 47, it is possible to avoid the stall of the executing unit such as the LSU4. That is, when the access to the SPRAM 42 by the executing unit conflicts with a DMA transfer, data of the executing unit is stored in the SSB 45 or the store buffers 46 and 47 until the DMA transfer finishes, and during the period, the pipeline can execute another processes.

As shown in FIG. 8, when the SPRAM 42 and the DCACHE 41 share the store buffer 46, a select circuit which selects the SPRAM 42 or the DCACHE 41 is necessary. Therefore, the configuration of the store buffer 46 is more complicated than that shown in FIG. 9.

FIG. 10 is a timing chart showing the situation where the access by the executing unit conflicts with the DMA transfer, and shows an example where the priority of the DMA is higher than that of the executing unit.

For example, at time point T1, when the DMA conflicts with the access of the executing unit Pipe A, the DMA is executed preemptively, and data D1 from the executing unit Pipe A is temporarily stored in the SSB 45. Then, at time point T2, the process of the executing unit Pipe A stored in the SSB 45 is executed. At the same time, the data D2 of the executing unit Pipe B which is to be transferred is stored in the SSB 45.

At the time point T3, the DMA is executed preemptively. At this time point, because data D2 of the executing unit Pipe B is being stored in the SSB 45, the executing unit Pipe C which is going to be accessed is stalled.

After that, at time point T4, the process of the executing unit Pipe B stored in the SSB 45 is executed. At the same time, data D3 of the executing unit Pipe C which has been stalling is stored in the SSB 45.

FIG. 11 is a timing chart showing write timing of the SPRAM 42. As shown in FIG. 11, a DMA write is executed at every two clocks of a system clock CLK. Data of two clocks length of the system clock CLK is supplied to the CPU bus.

FIG. 12 is a timing chart showing read timing of the SPRAM 42. As shown in FIG. 12, a DMA read is executed at every two clocks of the system clock. Data of one clock length of the system clock CLK is outputted from the SPRAM 42, and data of two clocks length of the system clock CLK is outputted to the CPU bus.

Though ordinary load/store instruction may be used to access the SPRAM 42, specific instructions to access the SPRAM 42 may be provided. As examples of such specific instructions, an SPRAM index load data instruction, an SPRAM index store instruction, an SPRAM index store immediate data instruction, a block transfer instruction to the SPRAM 42, a block transfer instruction from the SPRAM 42 and so on may be provided. When these instructions are issued, if these instructions are given priority to the control by the MMU 3, it is possible to access the SPRAM 42 at high speed. By providing the specific instructions for the SPRAM 42, the programmers can use the SPRAM 42 easily, and programming design simplifies.

An example that the SPRAM 42 does not have snoop function has been explained. The SPRAM 42 may have the snoop function in accordance with a further embodiment. Here, the "snoop" is to detect whether or not the SPRAM 42 or the DCACHE 41 holds latest data being stored to the external memory. The reason why the snoop is necessary is that the corresponding data does not exist in the external memory and there may be a case where the SPRAM 42 or the DCACHE 41 holds.

Figure 13:
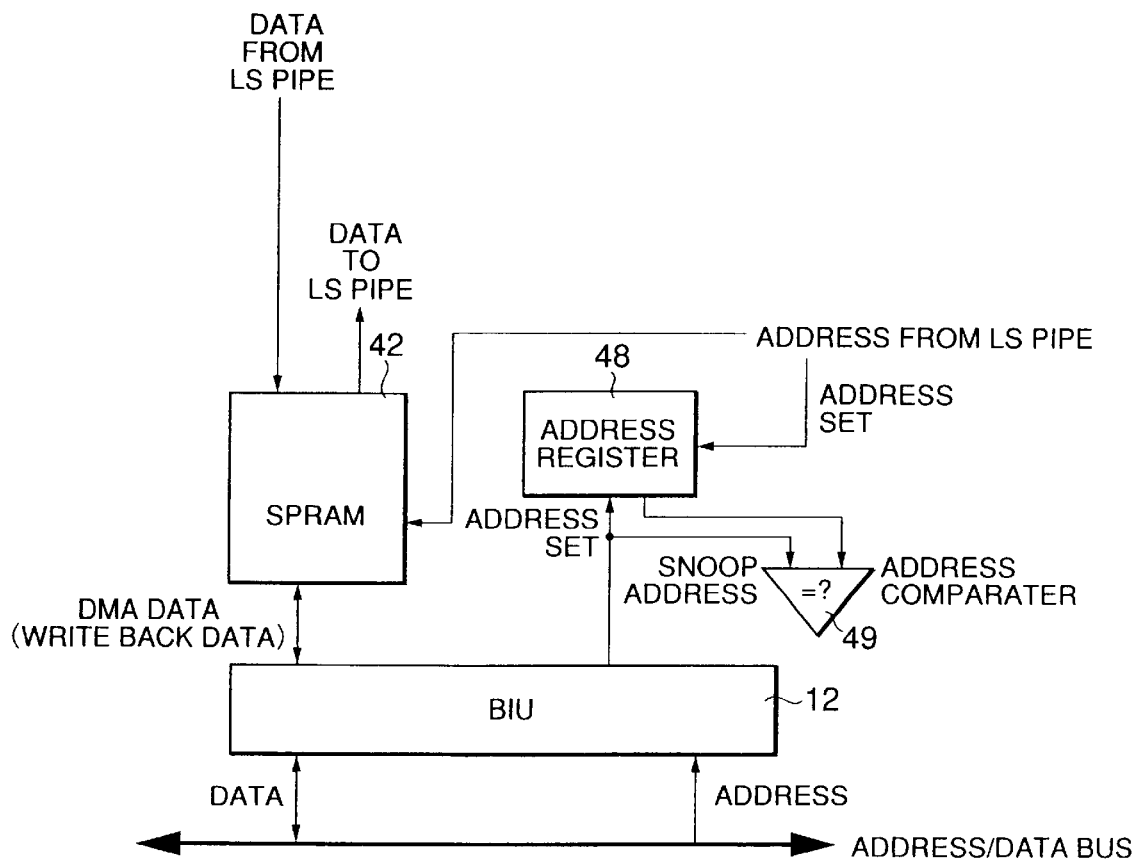
FIG. 13 is a peripheral circuit of the SPRAM 42 having the snoop function.

FIG. 13 is a peripheral circuit of the SPRAM 42 having the snoop function. As shown in FIG. 13, an address register 48 and an address comparator 49 are provided for the processor. The address register 48 functions as the TAG of the SPRAM 42. The address of data being stored in the SPRAM 42 and so on are stored in the address register. When the SPRAM 42 is divided into n pieces of entries, the address registers in accordance with the number of entries are provided. The address registers are connected to the CPU bus and the content of the address registers can be read out via the CPU bus.

Though not shown in FIG. 13, means to write to the address register 48 may be provided. For example, this may occur with specific instructions to the LSU 4. More specifically, the programmers give a certain address in order to write to the address register 48. Otherwise, when data is written to the SPRAM 42 by the DMA, a source address of the DMA may be automatically set to the address register 48.

An address comparator 49 of FIG. 13 is connected to the address/data bus via the BIU 12. The address comparator 49 compares the address set to the address register 48 with the address sent from an agent requiring the snoop. If both of the addresses coincide with each other, the address comparator 49 determines a snoop hit. What operation is executed at the time of a snoop hit varies depending on the system configuration.

For example, when the snoop hits, the BIU 1 acquires bus authority, and reads out data of hit entry in the SPRAM 42 to the CPU bus. Otherwise, when the snoop hits, no process may be executed.

As the operation in case of the snoop hit in the system including the processor, for example, the following (1) and (2) may occur.

(1) The agent issuing the snoop receives data from the SPRAM 42.

(2) The agent issuing the snoop waits until the SPRAM 42 is going to send data.

In case of (2), one bit of a flag is added to the address register 48. The flag is set when an executing unit in the processor is using the SPRAM 42. The flag is connected to the BIU 12 and is set/reset by the instruction from the executing unit. While the flag is being set, if the snoop hits to the SPRAM 42, the agent which has issued the snoop goes to waiting status.

When there is a program sequence processing data on the SPRAM, even at the point executing the instructions except the load/store instruction in the program sequence, if data process on the SPRAM has not finished yet, it is not supposed to permit the snoop. In this case, it is desirable that the flag inhibiting the snoop is not the flag showing that the SPRAM is accessed by the load/store instruction, but the flag inhibiting the snoop regardless of the types of the instructions. Furthermore, it is desirable to be able to set the flag by software.

Thus, if the snoop function is added to the SPRAM 42, it is possible to detect data the SPRAM 42 is now retaining from outside. Furthermore, for the occasion that has arisen, it is possible to read out data being stored to the SPRAM 42. Accordingly, the program design is simplified.

What is claimed is:

1. A microprocessor comprising:
   a load/store instruction executing block for executing a load/store instruction;
   a RAM (Random Access Memory), from and to which said load/store instruction executing block is able to read and write data, said RAM exchanging data with an external memory through a DMA (Direct Memory Access) transfer, said RAM including at least a first and second data storing areas; and
   a RAM control block for controlling said RAM so that the DMA read/write transfer of data between said second data storing area and said external memory is executed subtantially at the same time as access to said first data storing area by said load/store instruction executing block, and the DMA transfer of data between said first data storing area and said external memory is executed substantially at the same time as access to said second data storing area by said load/store instruction executing block.

2. The microprocessor according to claim 1, wherein when an access to said RAM by said load/store instruction executing block conflicts with the DMA transfer from/to said RAM, said RAM control block gives a priority to the DMA transfer.

3. The microprocessor according to claim 1, further comprising:
   a control register which is capable of controlling a priority of the access to said RAM by said load/store instruction executing block over the access to said RAM through the DMA transfer.

4. The microprocessor according to claim 1, further comprising:
   an external pin which is capable of controlling a priority of the access to said RAM by said load/store instruction executing block over the access to said RAM through the DMA transfer.

5. The microprocessor according to claim 1, further comprising:
   a store buffer for temporarily storing data relating to the access to said RAM by said load/store instruction executing block before the access is performed.

6. The microprocessor according to claim 5, further comprising:
   the RAM control block giving a priority to the access to said RAM through the DMA transfer when the access to said RAM by said load/store instruction executing block conflicts with the access through the DMA transfer, and temporarily storing to said store buffer data relating to the access to said RAM by said load/store instruction executing block.

7. The microprocessor according to claim 1, wherein specific instructions for an access to said RAM are provided.

8. The microprocessor according to claim 7, wherein at least an instruction to directly read from or write into said RAM or an instruction to perform a block DMA transfer between said RAM and said external memory is included in said specific instructions.

9. The microprocessor according to claim 7, wherein when said specific instructions are given, said load/store instruction executing block executes said specific instructions, ignoring designation of a memory management unit.

10. The microprocessor according to claim 1, further comprising:
    a cache memory for temporarily storing data read out from said external memory,
    wherein said load/store instruction executing block accesses said RAM and said cache memory with substantially equal latency.

11. The microprocessor according to claim 10, further comprising:
    a store buffer for temporarily storing data relating to the access to said RAM or said cache memory by said load/store instruction executing block before the access is performed,
    wherein said data stored in said store buffer are transferred through a selection to either said RAM or said cache memory.

12. The microprocessor according to claim 10, further comprising:
    a first store buffer for temporarily storing data relating to the access to said RAM by said load/store instruction executing block before the access is performed; and
    a second store buffer for temporarily storing data relating to the access to said cache memory by said load/store instruction executing block before the access is performed.

13. The microprocessor according to claim 1, further comprising:
    an address register for storing an address corresponding to the data stored in said RAM; and
    a comparator for comparing the address stored in said address register with a target address of a snoop, wherein said RAM operates in accordance with the comparative result of said comparator.

14. The microprocessor according to claim 13, wherein the address stored in said address register coincides with the target address of the snoop, data of said RAM corresponding to the coincident address is transferred to an agent which has required the snoop.

15. The microprocessor according to claim 14, wherein said address register includes flag information indicating whether or not said load/store instruction executing block is accessing said RAM, and if said flag information indicates that said load/store instruction executing block is accessing said RAM, further access of said agent which has required said snoop is temporarily inhibited.

16. The microprocessor according to claim 13, wherein an instruction for setting the addresses to said address register is provided.

17. The microprocessor according to claim 13, wherein addresses of the data transferred by the DMA transfer are set in said address register.

18. The microprocessor according to claim 14, wherein said address register includes flag information indicating whether or not said RAM accepts the snoop, and if said flag information indicates that said RAM does not accept said snoop, further access of said agent which has required said snoop is temporarily inhibited.

19. The microprocessor according to claim 18, wherein an instruction for setting said flag is provided.

20. The microprocessor according to claim 1, wherein said RAM is a cache memory for temporarily storing image data.

* * * * *